United States Patent
Firuz et al.

(10) Patent No.: US 7,364,121 B2
(45) Date of Patent: Apr. 29, 2008

(54) METHODS AND SYSTEMS FOR AUTOMATICALLY CONTROLLING AIRCRAFT TAKEOFF ROLLS

(75) Inventors: Guner Firuz, Seattle, WA (US);
Michael H. Jaeger, Seattle, WA (US);
Robert M. Agate, Seattle, WA (US);
William M. Bresley, Seattle, WA (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 11/080,111

(22) Filed: Mar. 14, 2005

(65) Prior Publication Data

US 2006/0214063 A1 Sep. 28, 2006

(51) Int. Cl.
*G05D 1/08* (2006.01)
*G05D 3/00* (2006.01)
*B64C 13/00* (2006.01)

(52) U.S. Cl. .................. 244/175; 244/194; 701/15
(58) Field of Classification Search ........... 244/103 W, 244/50, 175, 183–188, 194–195, 76 R; 701/120, 701/15
See application file for complete search history.

(56) References Cited

U.S. PATENT DOCUMENTS

| | | | | |
|---|---|---|---|---|
| 2,322,225 A * | 6/1943 | Crane et al. | ................. | 244/188 |
| 2,612,331 A * | 9/1952 | Frazier et al. | ............... | 244/188 |
| 3,094,299 A * | 6/1963 | Bond et al. | ................. | 244/197 |
| 3,691,356 A * | 9/1972 | Miller | .......................... | 701/15 |
| 3,757,887 A * | 9/1973 | Moore et al. | ................ | 180/168 |
| 3,837,603 A * | 9/1974 | Schultz et al. | .............. | 244/184 |
| 3,908,934 A * | 9/1975 | Schloeman | .................. | 244/182 |
| 4,122,522 A * | 10/1978 | Smith | .......................... | 701/15 |
| 4,151,595 A * | 4/1979 | Pressiat | ..................... | 701/120 |
| 4,482,961 A * | 11/1984 | Kilner et al. | ................. | 701/16 |
| 4,935,682 A * | 6/1990 | McCuen | ..................... | 318/586 |
| 5,047,942 A * | 9/1991 | Middleton et al. | ............ | 701/15 |
| 5,574,648 A * | 11/1996 | Pilley | .......................... | 701/120 |
| 6,722,610 B1 * | 4/2004 | Rawdon et al. | ........ | 244/103 W |
| 6,880,784 B1 * | 4/2005 | Wilkinson et al. | ........ | 244/76 R |
| 2004/0059497 A1* | 3/2004 | Sankrithi | ..................... | 701/120 |

OTHER PUBLICATIONS

FreeFlight System, GPS, (3 pgs); http://www.freeflightsystems.com/gps_landing.htm; [accessed Oct. 6, 2004].

(Continued)

*Primary Examiner*—Rob Swiatek
(74) *Attorney, Agent, or Firm*—Perkins Coie LLP

(57) ABSTRACT

Methods and systems for automatically controlling aircraft takeoff rolls. A method in accordance with one embodiment of the invention includes receiving an indication of a target takeoff roll path for an aircraft, and automatically controlling a direction of an aircraft, while the aircraft is on a takeoff roll, to at least approximately follow the target takeoff roll path. The method can further include providing an input to a rudder of the aircraft and, upon receiving an indication of an engine failure, can transfer the input from the rudder to a rudder trim element. In still further embodiments, the method can include commanding a ground track angle when an airspeed of the aircraft reaches a threshold value, and maintaining the ground track angle as the airspeed of the aircraft exceeds the threshold value.

27 Claims, 12 Drawing Sheets

OTHER PUBLICATIONS

Aviation Navigation, Tutorial, (3 pgs); http//virtualskies.arc.nasa.gov/navigation/tutorial3.html; [accessed Oct. 6, 2004].

The Flightsim Aviation Zone, Aviation Theory, ILS Navigation part 1: The Localizer, (5 pgs); http://www.flightsimaviation.com/aviation_theory_24_ILS_Navigation_part_1_The_Localizer.html; [accessed Oct. 6, 2004].

* cited by examiner

METHODS AND SYSTEMS FOR AUTOMATICALLY CONTROLLING AIRCRAFT TAKEOFF ROLLS

TECHNICAL FIELD

The present invention is directed generally to methods and systems for automatically controlling aircraft takeoff rolls.

BACKGROUND

Conventional commercial transport aircraft include a multitude of automated systems for controlling the aircraft during flight. These systems include an aircraft autopilot, which can be activated by the flight crew after the aircraft has reached 200 feet in altitude for automatically guiding the aircraft along a target track. These systems also include flight directors and other visual cues that do not actually control the motion of the aircraft, but provide a moving target at the flight deck which the pilot "captures" when flying along the target track. Such visual guide cues can also be activated during takeoff.

One drawback with the visual systems that provide guidance cues during aircraft takeoff is that while they adequately perform their intended functions, they may have limited utility in some conditions. These conditions may include low runway visibility, wet or icy runways, strong crosswinds, engine-out takeoffs, and/or engine-out refused takeoffs. Accordingly, it may be desirable to have automatic systems that provide an increased level of performance under these conditions.

SUMMARY

The following summary is provided for the benefit of the reader and does not limit the invention as set forth in the claims. The present invention is directed generally toward methods and systems for automatically controlling aircraft takeoff rolls. A method in accordance with one aspect of the invention includes receiving an indication of a target takeoff roll path for an aircraft, and automatically controlling a direction of the aircraft while the aircraft is on a takeoff roll, so as to at least approximately follow the target takeoff roll path. In further particular aspects of the invention, the method can further include providing an input to a rudder of the aircraft, and in response to receiving an indication of an engine failure, transferring the input from the rudder to a rudder trim element. In still further particular aspects, the method can include gradually reducing the automatic control of the aircraft once the aircraft exceeds a threshold pitch angle.

Aspects of the invention are also directed toward systems for controlling an aircraft. One such system includes a receiver configured to receive an indication of a target takeoff roll path for an aircraft, and a controller coupled to the receiver to receive the indication of the target roll path. The controller can further be coupled to a steering system of the aircraft to automatically control a direction of the aircraft while the aircraft is on a takeoff roll, so as to at least approximately follow the target takeoff roll path.

A method in accordance with still another aspect of the invention includes determining a lateral deviation distance from a target path, determining a lateral acceleration, and filtering the lateral deviation with the lateral acceleration to produce a filtered lateral deviation. The method can further include filtering the lateral acceleration with the lateral deviation to produce a filtered lateral deviation rate. The method can then also include determining a commanded lateral position and commanded lateral position rate based on the complementary filtered lateral deviation and complementary filtered lateral deviation rates. Based on the commanded position, the filtered lateral deviation, the commanded lateral position rate and the filtered lateral deviation rate, the method can include determining a first commanded angular position. Based on the first commanded angular position, a sensed yaw rate, and a commanded lateral acceleration, the method can include determining a second commanded angular position. The method can further include directing a rudder and landing gear of the aircraft to move in a manner that directs the aircraft to the second commanded angular position. The foregoing arrangements can provide for a robust, automated system for controlling aircraft takeoff rolls.

DETAILED DESCRIPTION

The present disclosure describes systems and methods for automatically controlling aircraft takeoff rolls. Certain specific details are set forth in the following description and in FIGS. 1-9C to provide a thorough understanding of various embodiments of the invention. Well-known structures, systems and methods often associated with these systems have not been shown or described in detail to avoid unnecessarily obscuring the description of the various embodiments of the invention. In addition, those of ordinary skill in the relevant art will understand that additional embodiments of the invention may be practiced without several of the details described below.

Many embodiments of the invention described below may take the form of computer-executable instructions, including routines executed by a programmable computer. Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below. Accordingly, the term "computer" as generally used herein refers to any data processor and can include Internet appliances, hand-held devices (including palm top computers, wearable computers, cellular or mobile phones, multi-processor systems, processor-based or programmable consumer electronics, network computers, mini-computers and the like). Information presented by these computers can be presented at any suitable display medium, including a CRT display or LCD.

The invention can also be practiced in distributed computing environments, where tasks or modules are performed by remote processing devices that are linked through a communications network. In a distributed computing environment, program modules or subroutines may be located in local and remote memory storage devices. Aspects of the invention described below may be stored or distributed on computer-readable media, including magnetic or optically-readable or removable computer disks, as well as distributed electronically over networks. Data structures and transmissions of data particular to aspects of the invention are also encompassed within the scope of the invention.

Figure 1:
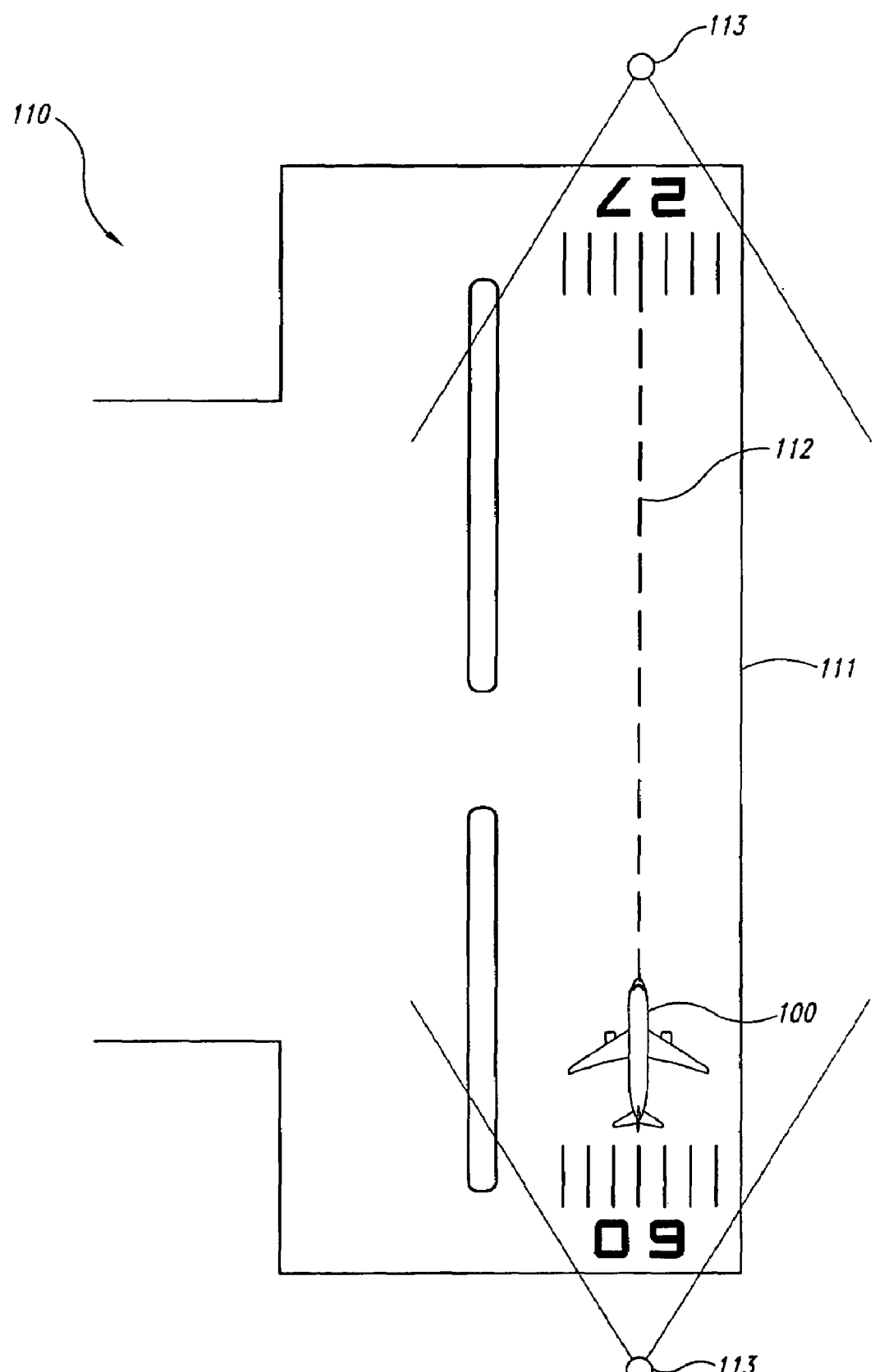
FIG. 1 is a partially schematic illustration of an aircraft positioned on a runway for takeoff.

FIG. 1 illustrates an aircraft 100 positioned on a runway 111 of an airport 110. The runway 111 includes a runway centerline 112 extending between ends of the runway 111. Information obtained from localizer beacons 113 positioned at the ends of the runway 111 can be used to identify a target track (e.g., the runway centerline 112) along which the aircraft 100 is guided during takeoff. In other embodiments, this information can be obtained from other sources (e.g., satellite-based sources). Certain embodiments of the methods and systems described below are directed to automatically keeping the aircraft 100 on or very near the runway centerline 112 during a takeoff roll.

Figure 2A:
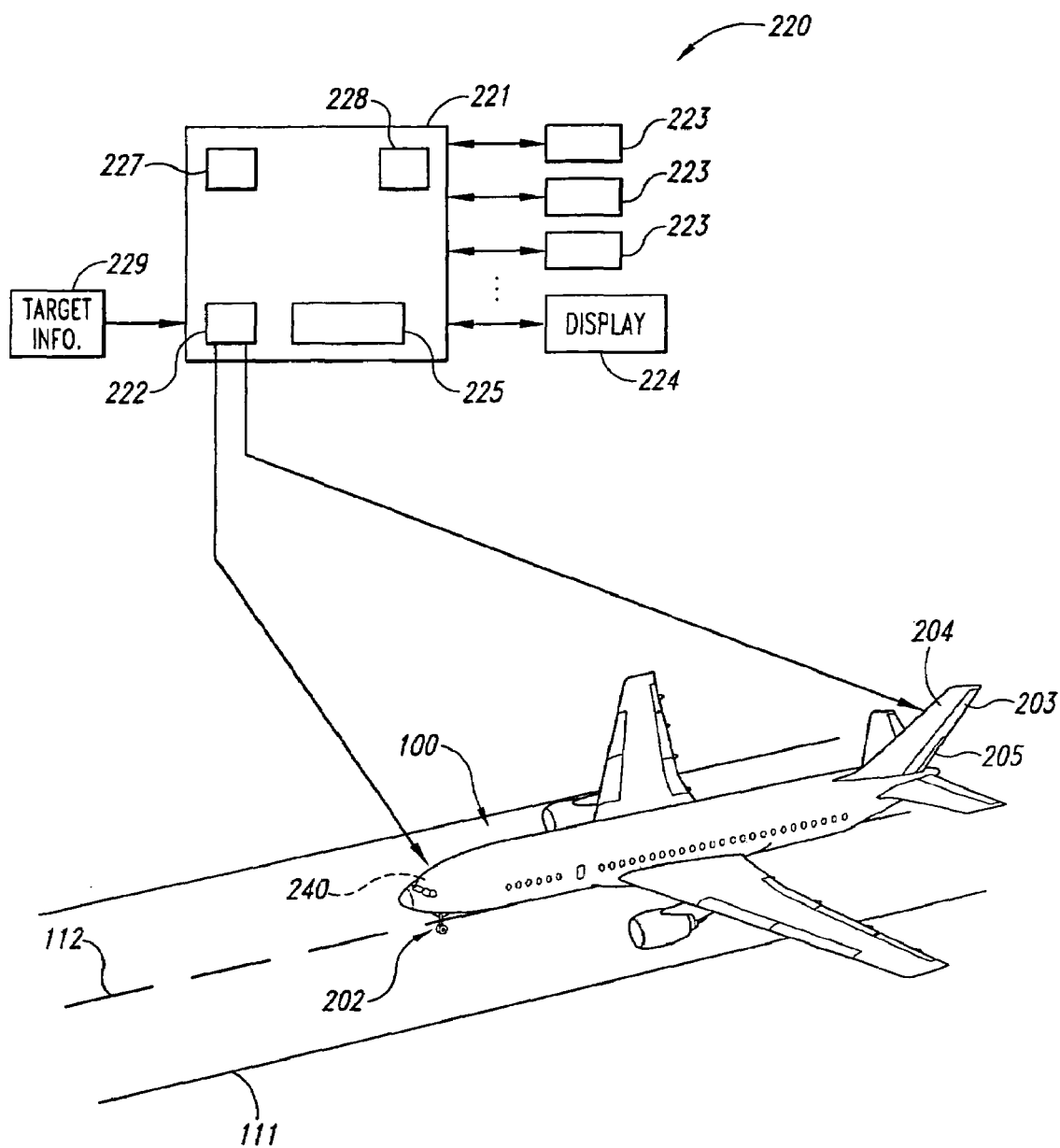
FIG. 2A is a partially schematic illustration of an aircraft and a system for controlling the aircraft during a takeoff roll, in accordance with an embodiment of the invention.

FIG. 2A illustrates the aircraft 100 along with a system 220 for controlling the lateral direction of the aircraft 100 during a takeoff roll. The aircraft 100 can include a flight deck 240 at which flight instruments are housed, a nose gear 202 which steers the aircraft 100 while the aircraft is on the ground, and a vertical stabilizer 204 that provides directional control both on the ground and in the air. The vertical stabilizer 204 can include a pivotable rudder 203 that yaws the aircraft 100, and a rudder trim tab 205 that can be adjusted to place a fixed yawing moment on the aircraft 100. In another embodiment, the trim tab 205 can be eliminated, and the rudder 203 can be coupled to a primary motor and a separate trim motor that holds a bias on the rudder 203. The system 220 can automatically direct the motion of the rudder 203, the (optional) rudder trim tab 205, and the nose gear 202.

In one aspect of this embodiment, the system 220 includes a computer 221 having a processor 227 and a memory 228. The computer 221 can also include a receiver portion 225 that receives input signals, and a controller 222 that directs control signals to the aircraft 100, based on the input signals received by the receiver portion 225. Accordingly, the receiver portion 225 can receive target information 229 corresponding to the target path along which the aircraft 100 is to be guided. The system 220 can also include sensors 223 that provide information about the velocities and accelerations of the aircraft 100 as it proceeds down the runway. Information corresponding to the operation of the system 220 can be presented at one or more displays 224, which may in turn be located at the flight deck 240.

Figure 2B:
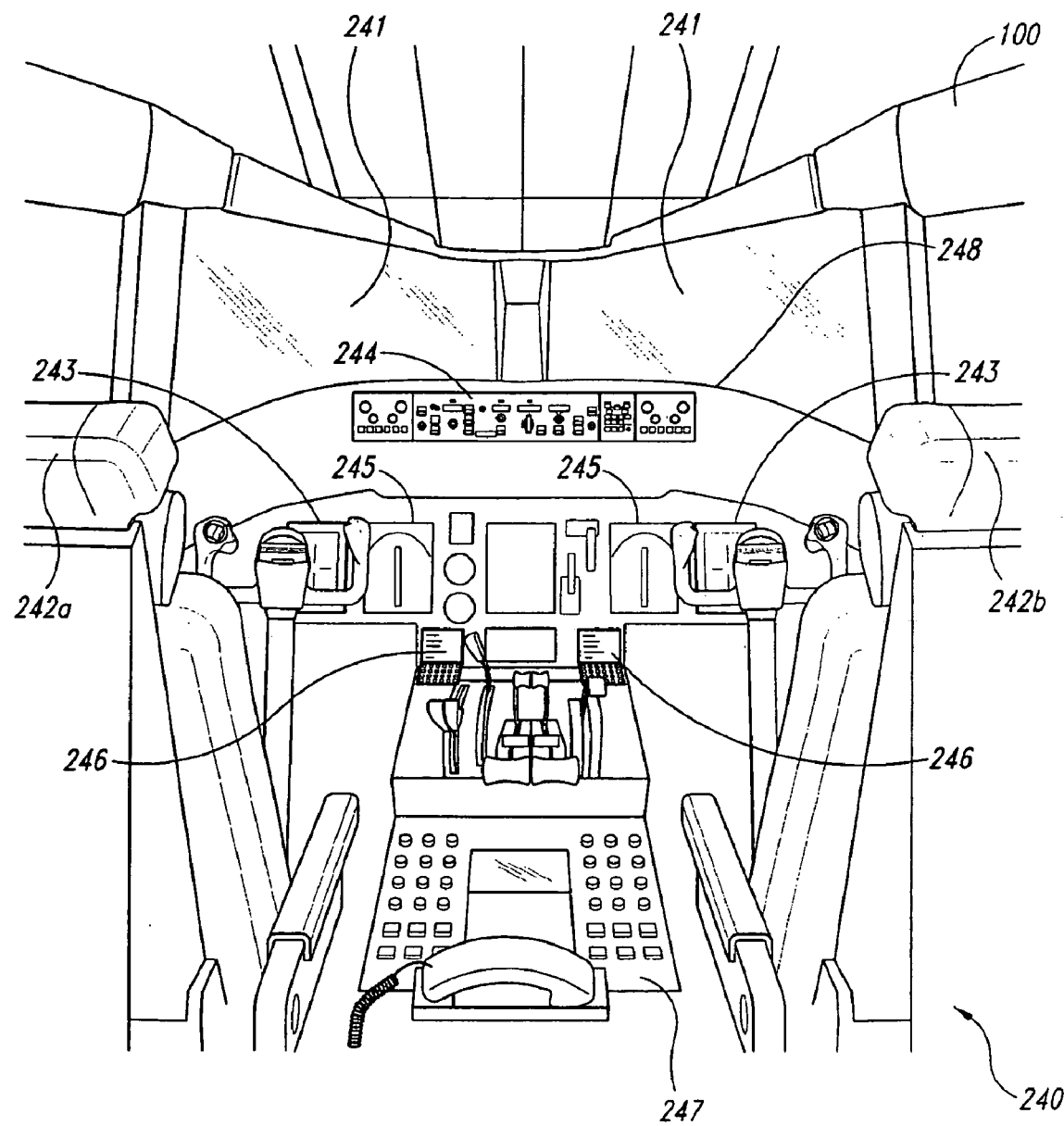
FIG. 2B is a schematic illustration of an aircraft flight deck that can house portions of the system shown in FIG. 2A.

FIG. 2B is a partially schematic illustration of the flight deck 240, which can include windshields 241, a glare shield 248 below the windshield, a mode control panel 244 housed in the glare shield 248, and seats 242a, 242b from which the flight crew can access the mode control panel 244. The flight crew can also access a primary flight display 243, navigation displays 245, and control and display units (CDUs) 246 positioned on a control pedestal 247. The primary flight display 243 can include a flight director or other visual cue that can be automatically moved to provide guidance cues for the flight crew as they manually direct the aircraft. As discussed in greater detail below with reference to FIGS. 3-9C, the system 220 can also automatically control the motion of the aircraft 100, in addition to or in lieu of providing visual cues at the primary flight display 243.

Figure 3:
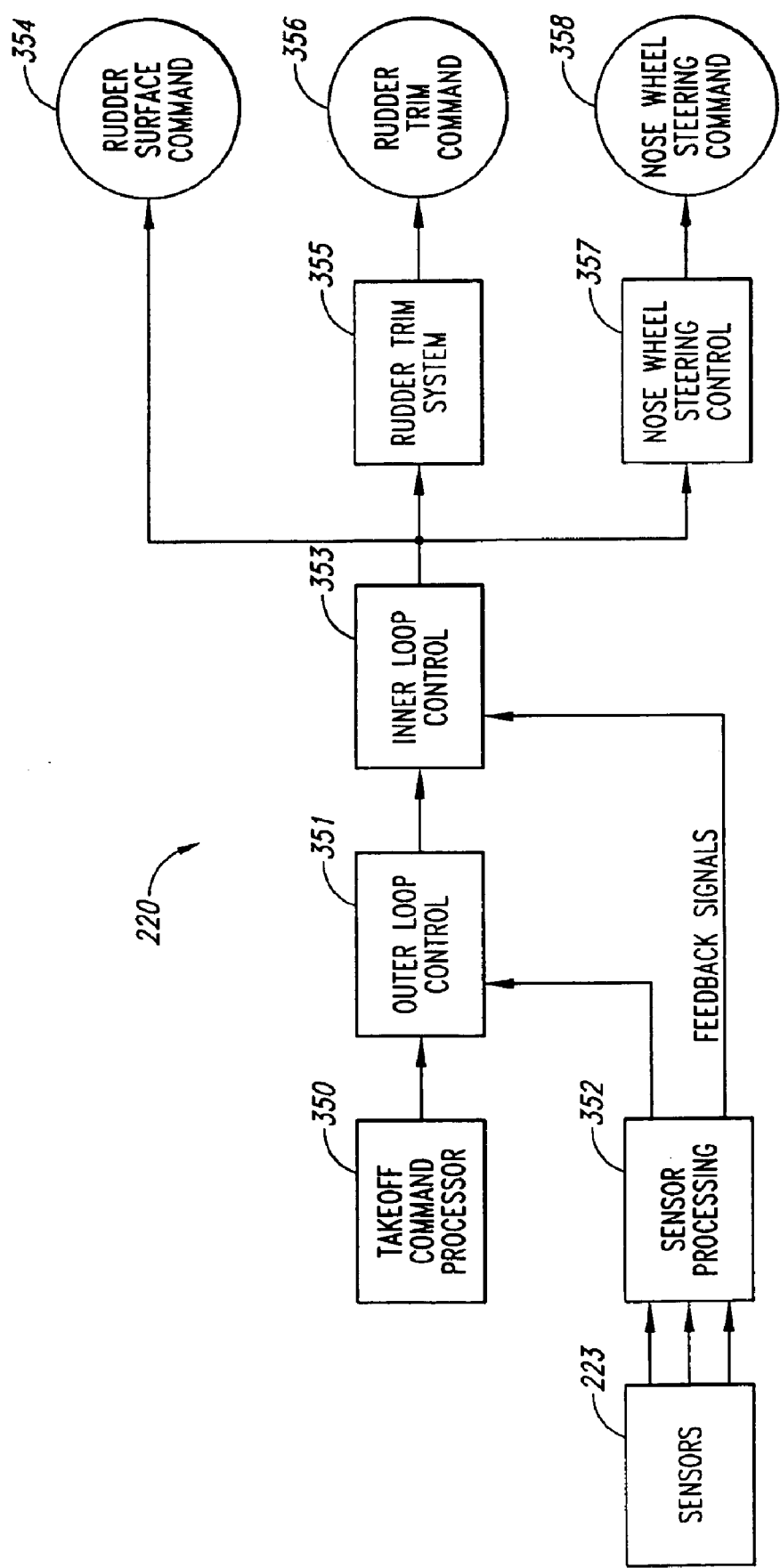
FIG. 3 is an overall flow diagram of a process by which a system controls an aircraft during takeoff, in accordance with an embodiment of the invention.

FIG. 3 is a flow diagram of a process by which the system 220 can control the rudder, rudder trim tab, and nose gear described above with reference to FIG. 2A. The system 220 can include a takeoff command processor 350 that receives instructions corresponding to deviations from the runway centerline, and produces commands to direct the aircraft toward the runway centerline. An outer loop control portion 351 receives the commands from the takeoff command processor 350 and combines them with information received from a sensor processor 352, which in turn receives information corresponding to the velocity and acceleration of the aircraft from the sensors 223. The outer loop control portion 351 produces an outer loop command that is combined with feedback signals at an inner loop control portion 353 to produce a rudder surface command 354. The rudder surface command 354 can automatically control the position of the aircraft rudder. A rudder trim system 355 can produce a rudder trim command 356 (which can provide additional directional stability during situations that include an engine-out takeoff). A nose wheel steering control portion 357 takes the rudder surface command 354 as input and produces a nose wheel steering command 358 (tailored for the nose gear) as output. The system 220 can also move the rudder input control device(s) (e.g., rudder pedals) in a corresponding manner to provide appropriate feedback to the pilot. Further details on the processes shown in FIG. 3 are described below.

Figure 4:
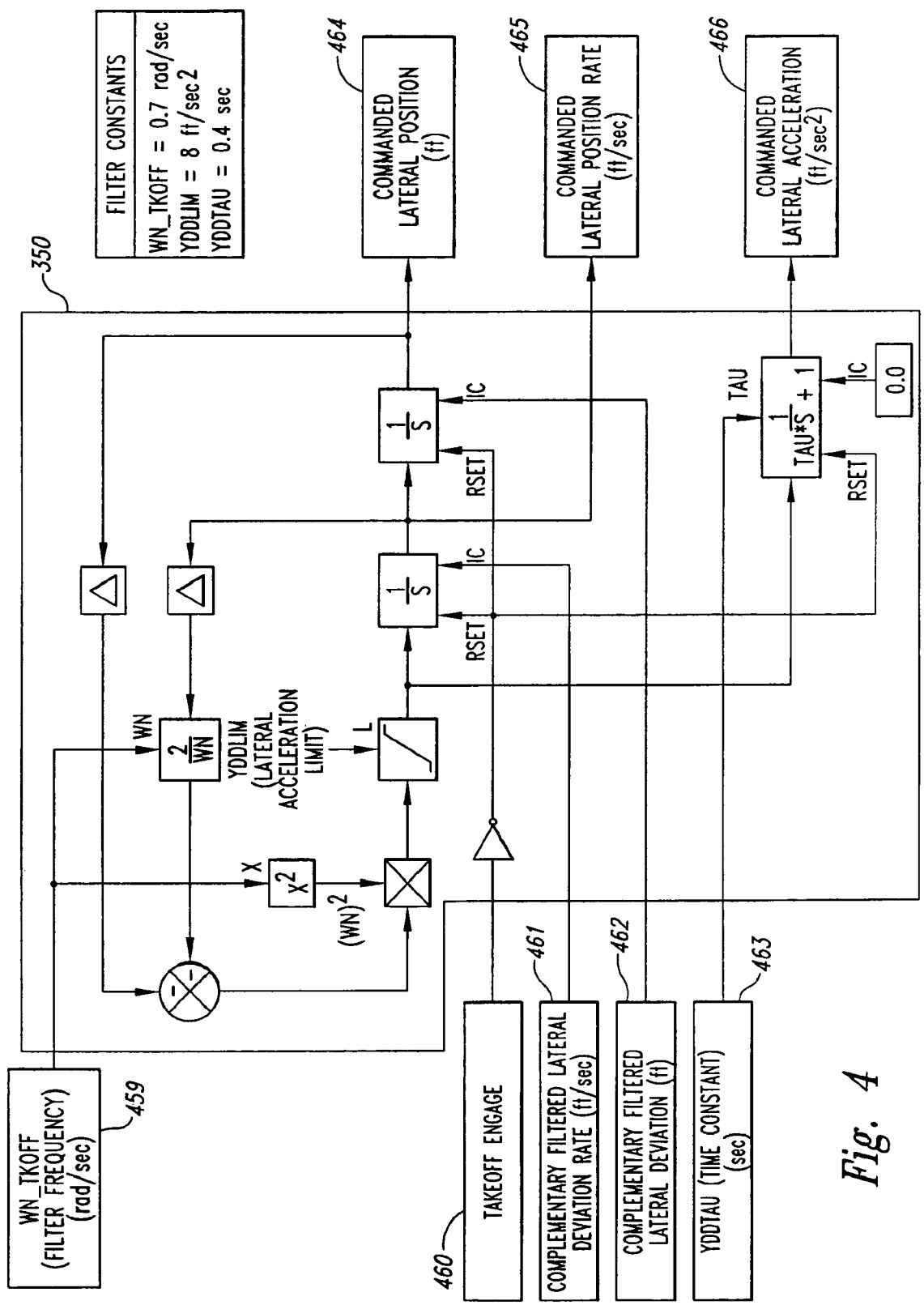
FIG. 4 is a schematic illustration of a takeoff command processor configured in accordance with an embodiment of the invention.

FIG. 4 schematically illustrates a process carried out by the takeoff command processor 350 in accordance with an embodiment of the invention. The takeoff command processor 350 can receive filter constants that determine the manner in which information is filtered by the takeoff command processor 350. The filter constants can include a filter frequency 459 (represented as WN-TKOFF in FIG. 4), a lateral acceleration time constant command 463 (represented as YDDTAU in FIG. 4) and a lateral acceleration limit (represented as YDDLIM in FIG. 4). The takeoff command processor 350 can also receive a signal corresponding to a flight crew instruction to engage the automatic takeoff function (block 460), along with lateral deviation data. The lateral deviation data can include a complementary filtered lateral deviation rate 461 and a complementary filtered lateral deviation 462. Further details regarding these data are provided later with reference to FIG. 5C. The takeoff command processor 350 can perform a series of integrations within a filtering arrangement to produce a commanded lateral position 464, a commanded lateral position rate 465, and a commanded lateral acceleration 466. These values correspond to, respectively, a target lateral position, a target rate at which the position is to be achieved, and a target acceleration via which the target position is to be achieved.

Figure 5A:
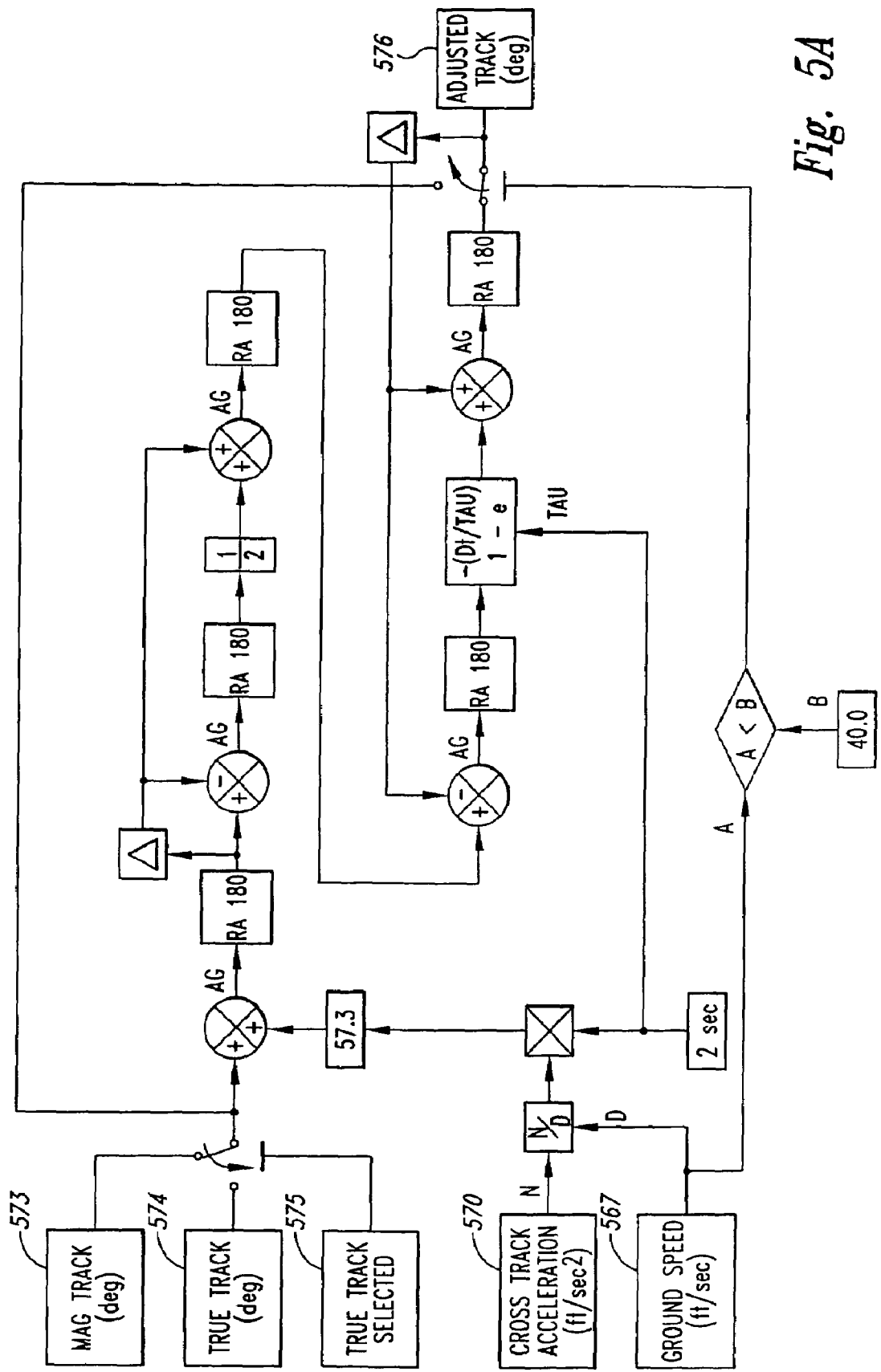
FIGS. 5A-5C are flow diagrams illustrating processes for computing runway tracking parameters in accordance with embodiments of the invention.
Figure 5B:
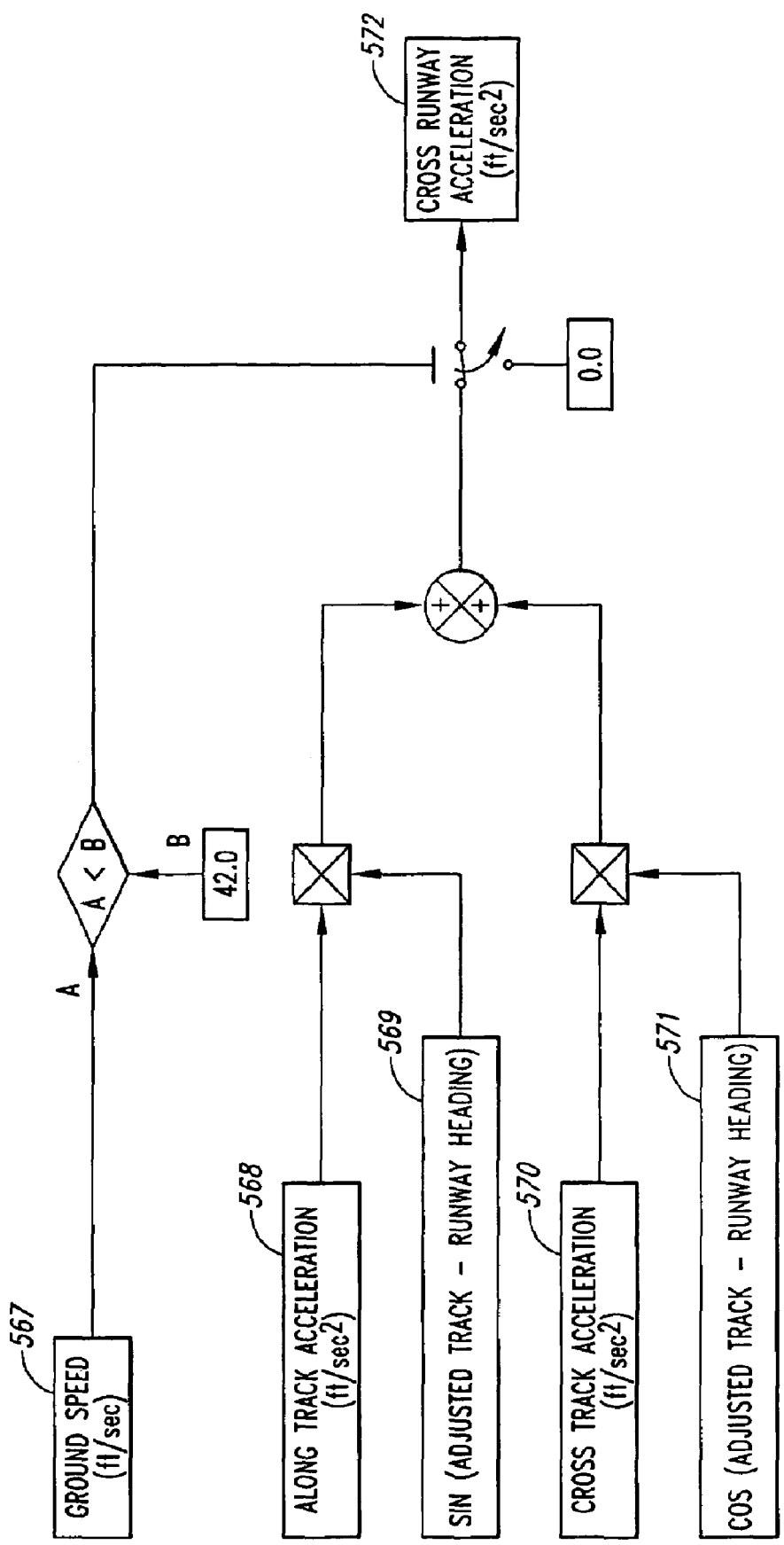
Figure 5C:
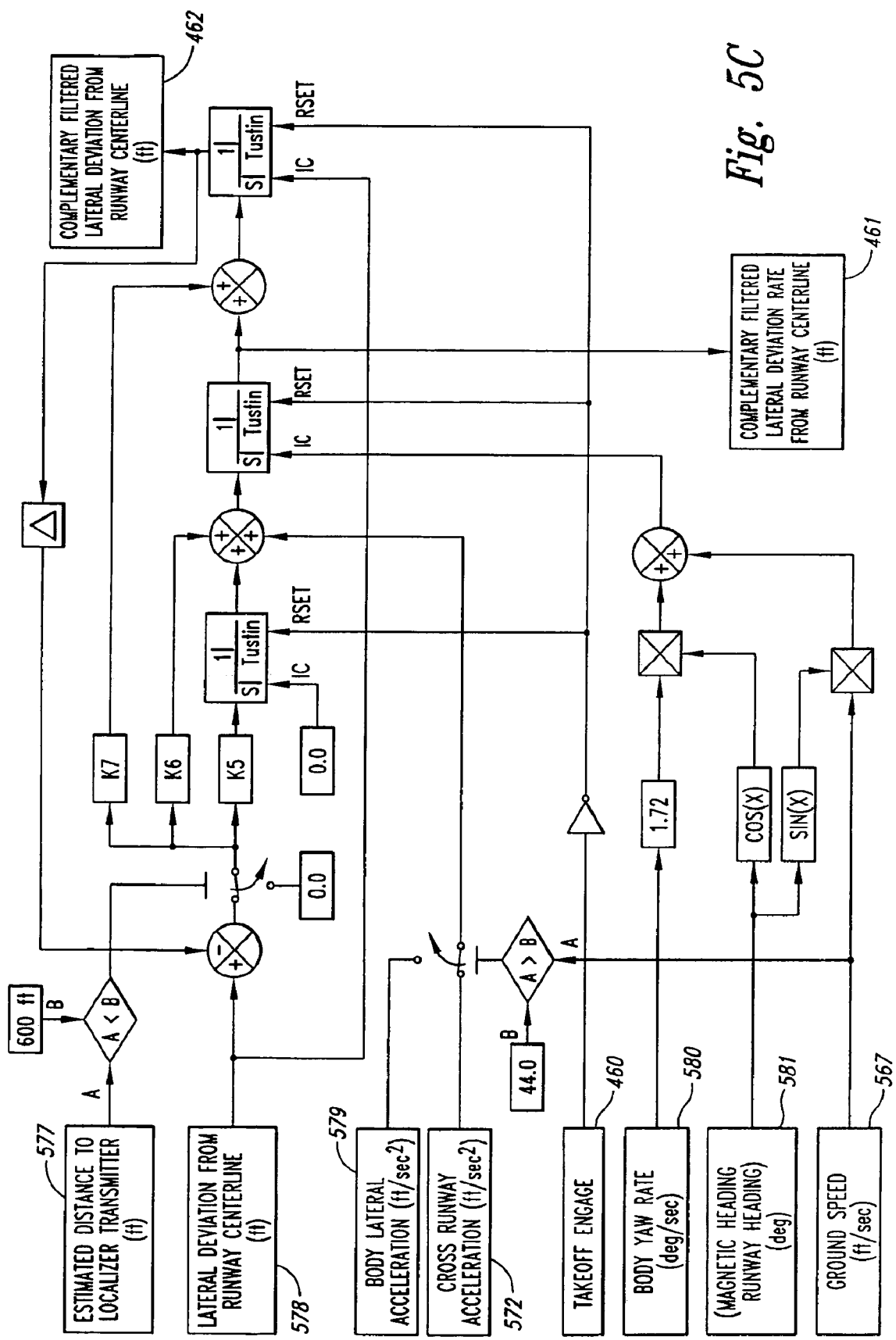

FIGS. 5A-5C illustrate processes that can be performed by the sensor processor 352 shown in FIG. 3 in accordance with several embodiments of the invention. Each of these processes can include, but need not be limited to filtering the sensor data (e.g., via a complementary filter that reduces low frequency noise without compromising high frequency sensor signal content). For example, FIG. 5A illustrates a process for producing an adjusted track value 576, based upon an input track value. The input track value can include a magnetic track 573, or a true track 574, and can be selected via a true track selection input 575. The magnetic track 573 refers to the angular orientation of the aircraft relative to magnetic north, and the true track signal 574 refers to the angular orientation of the aircraft relative to true north. The system can also receive a signal corresponding to ground speed (block 567) and, if the ground speed is less than a threshold speed (e.g., 40 knots) then the adjusted track angle can be equal to the magnetic track angle or the true track angle, whichever is selected via the selector 575. Once the aircraft's ground speed exceeds the threshold speed, the adjusted track angle can be corrected by an amount that depends upon the cross track acceleration 570. The cross track acceleration 570 corresponds to the component of the aircraft acceleration that is normal to the track along which the aircraft is directed.

FIG. 5B illustrates a process for determining a cross runway acceleration 572 based on the cross track acceleration 570 described above with reference to FIG. 5A. The cross runway acceleration 572 corresponds to the acceleration generally normal to the major axis of the runway 111 shown in FIG. 1. The cross-runway acceleration will differ from the cross track acceleration when the aircraft track deviates from the runway centerline 112 (FIG. 1). In an embodiment shown in FIG. 5B, the cross runway acceleration can be effectively zero when the aircraft ground speed 567 is less than a threshold value (e.g., 42 knots). When the aircraft exceeds the threshold speed, the cross runway acceleration 572 can be computed based on the along-track acceleration 568, the cross track acceleration 570, and trigonometric functions 569, 571 based upon the difference between the adjusted track value 576 described above with reference to FIG. 5A, and the runway heading.

FIG. 5C illustrates a process for determining the complementary filtered lateral deviation 462 (e.g., a deviation from the runway centerline), and the complementary filtered lateral deviation rate 461 (e.g., a deviation rate from the runway centerline). Both quantities are then used to determine the commanded lateral position, rate, and acceleration, as discussed above with reference to FIG. 4. The complementary filtered lateral deviation value 462 is obtained by filtering a lateral deviation from runway centerline value 578 with a body lateral acceleration value 579. The lateral deviation value 578 can be obtained from an ILS system, unless a value for an estimated distance to the relevant localizer 577 is less than a threshold value (e.g., 600 ft.). In this latter case, the last lateral deviation value 578 before passing the threshold value can be used.

The complementary filtered lateral deviation rate value 461 is obtained by filtering the body lateral acceleration value 579 with the lateral deviation value 578. The body lateral acceleration value 579 can be calculated from sensor data, and can revert to the sensed cross-runway acceleration 572 when the ground speed 567 is less than a threshold value (e.g., 44 feet/second). Sensed values for the body yaw rate 580 and runway heading 581 are also used to obtain the filtered values 461 and 462. One advantage of filtering the lateral deviation and lateral deviation rates is that it provides a high gain, stable feedback control loop, based primarily on position at low frequency values and rate at high frequency values. This arrangement is also expected to be less susceptible to signal noise.

Figure 6:
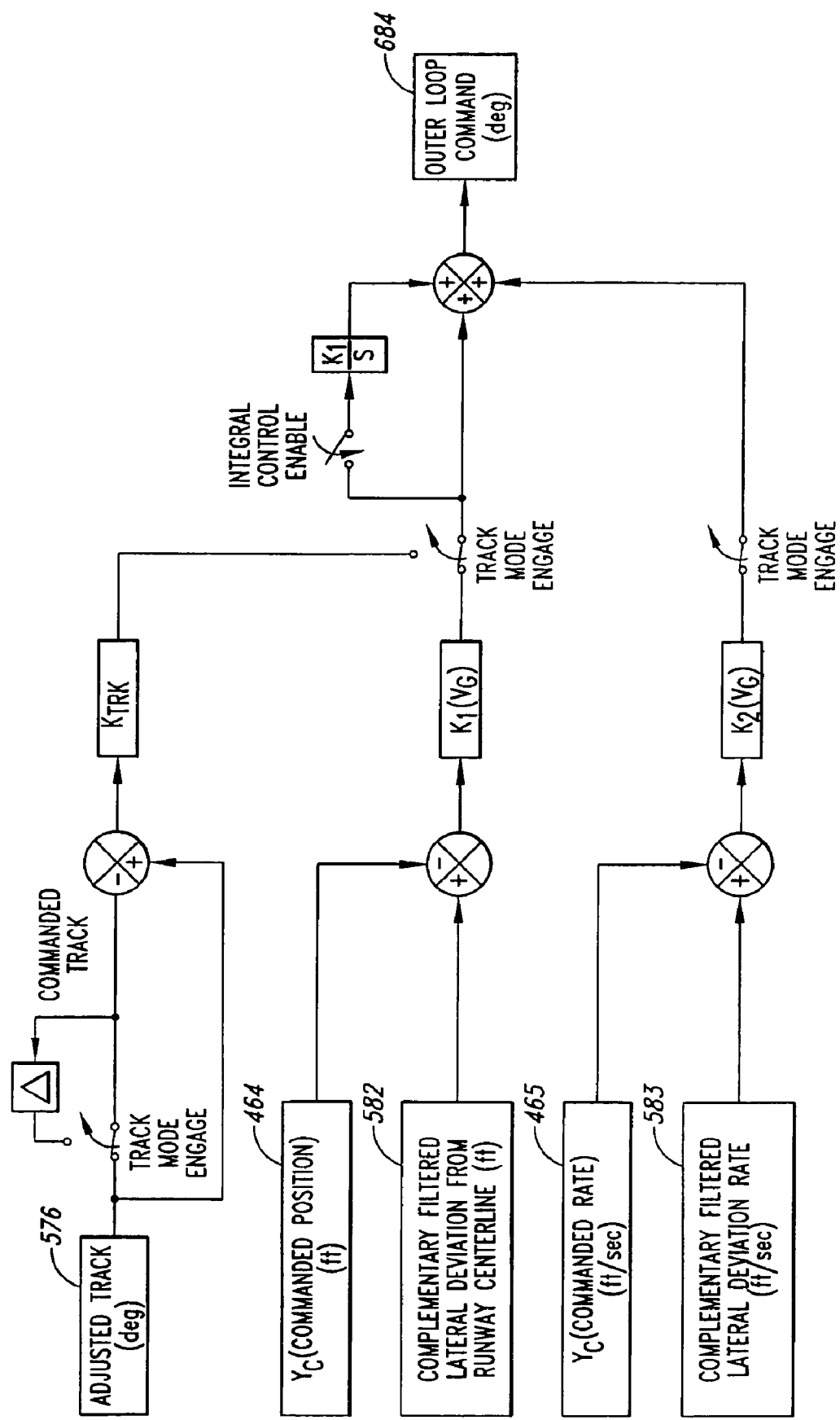
FIG. 6 is a flow diagram illustrating a method for computing an outer loop command in accordance with an embodiment of the invention.

FIG. 6 illustrates a process for computing an outer loop command 684 corresponding to a relatively slowly changing command signal for changing the position of the aircraft rudder. In one aspect of this embodiment, the outer loop command 684 results from a proportional integral control scheme. When the track mode function is not engaged, the outer loop command 684 corresponds to the lateral position 464 commanded by the pilot, filtered via the complementary filtered lateral deviation value 462. This value is combined with the commanded rate value 465 which is combined with the complementary filtered lateral deviation rate 461. When the track mode function is engaged, the outer loop command corresponds to the immediate past value for adjusted track 576.

Figure 7:
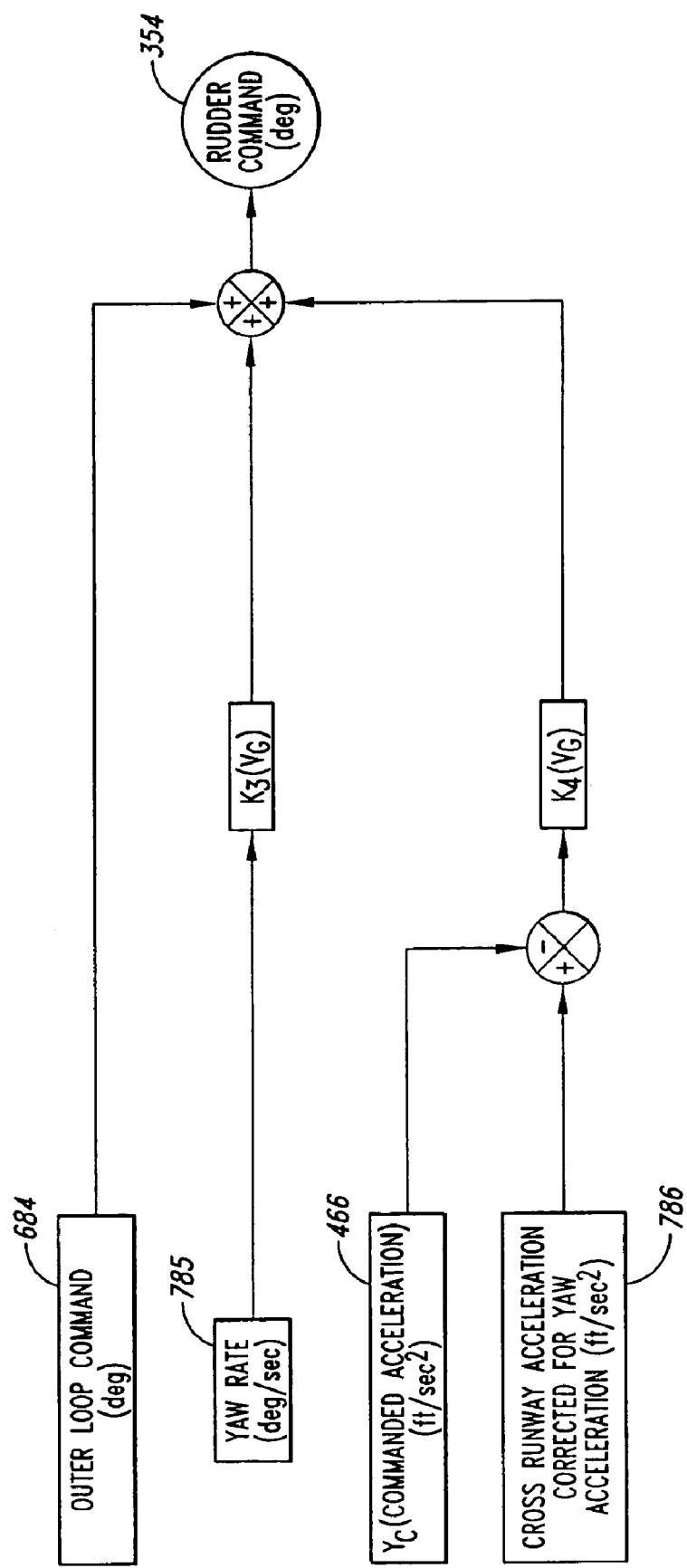
FIG. 7 is a flow diagram illustrating a process for computing a rudder command, based on the outer loop command.

FIG. 7 is a flow diagram illustrating the inner loop control, configured in accordance with an embodiment of the invention. In one aspect of this embodiment, the outer loop command 684 is summed with a sensed yaw rate value 785 and a difference between the commanded acceleration 466 and a cross runway acceleration value 786 corrected for yaw acceleration. The result is the rudder command 354.

Figure 8:
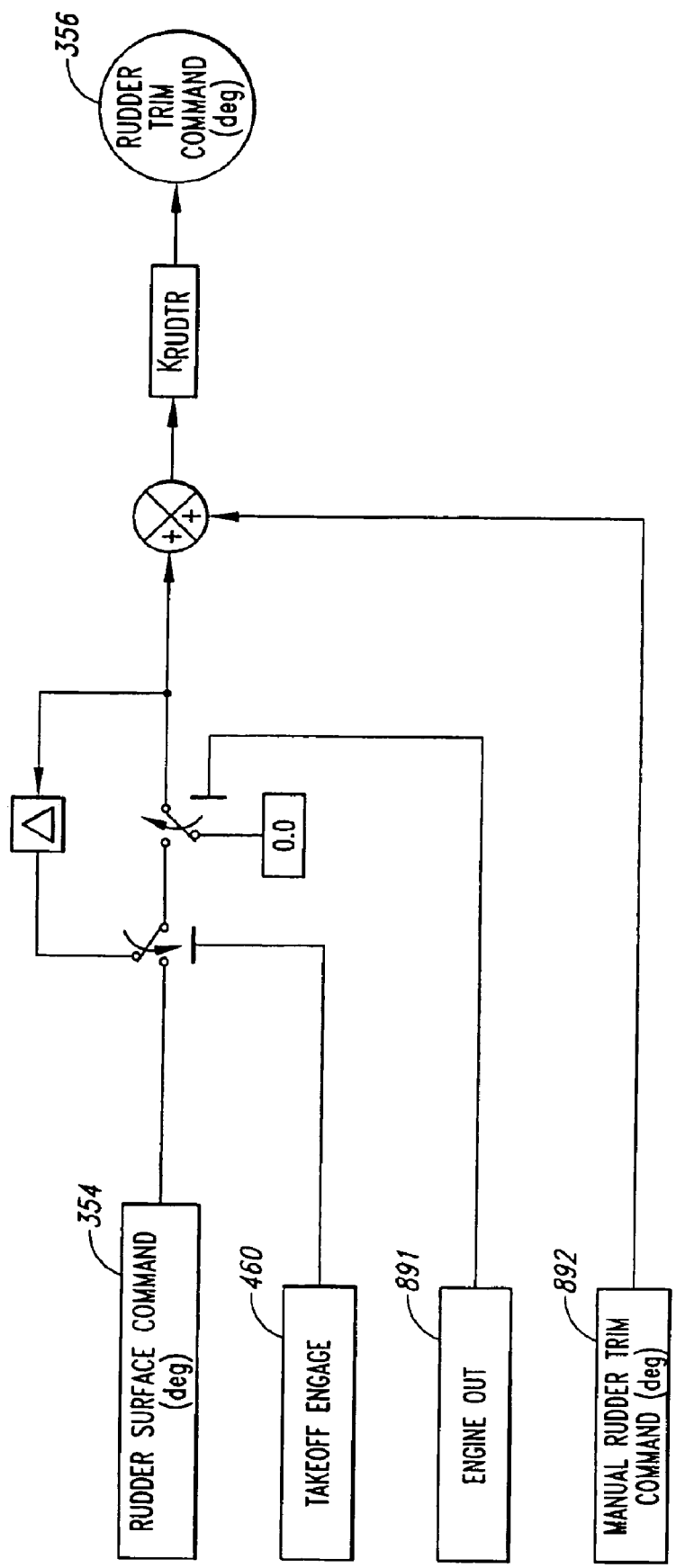
FIG. 8 is a flow diagram illustrating a process for affecting rudder trim during an engine-out condition.

FIG. 8 is a flow diagram illustrating a method for trimming the aircraft rudder in accordance with an embodiment of the invention. In one aspect of this embodiment, the rudder surface command 354 has no effect on the rudder trim command unless the system receives an engine-out signal 891. Instead, manual rudder trim commands 892 are used to determine the rudder trim command 356. However, when the takeoff engage function 460 is active and the system receives an engine-out signal 891, then the last rudder surface command 354 received after the aircraft has passed through a pitch attitude threshold is converted to a rudder trim command. Accordingly, the rudder trim is set to maintain the rudder position as the aircraft goes above the pitch attitude threshold. The aircraft may use this system in conjunction with other systems to further account for the yaw moment created by the engine-out condition.

Figure 9A:
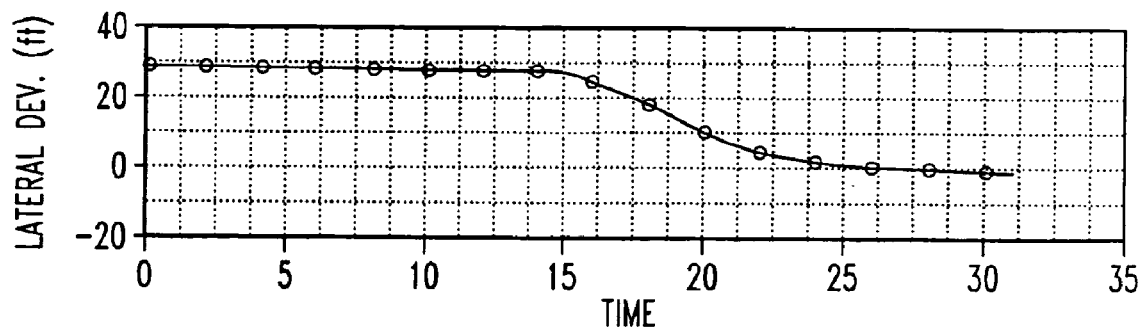
FIGS. 9A-9C illustrate simulated lateral deviations from a runway centerline using systems in accordance with embodiments of the invention.
Figure 9B:
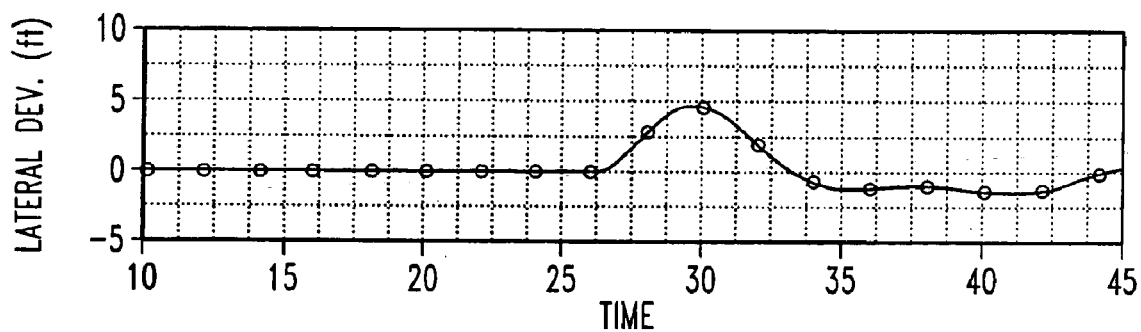
Figure 9C:
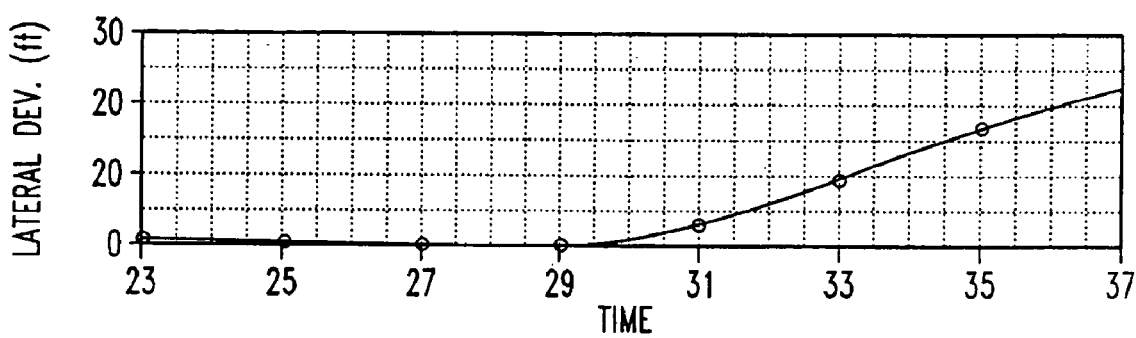

FIGS. 9A-9C illustrate expected aircraft performance associated with systems in accordance with aspects of the embodiments described above. Each Figure illustrates a graph depicting lateral deviation from the runway centerline as a function of time. Accordingly, each graph tracks the lateral progress of the aircraft as it moves down the runway during a takeoff roll.

FIG. 9A illustrates the lateral deviation from the runway centerline for an aircraft taking off after initially being located 30 feet away from the runway centerline. As is evident from FIG. 9A, the system can automatically and smoothly move the aircraft to the centerline before the aircraft takes off. Takeoff in this case occurs at about 30 seconds.

FIG. 9B illustrates the lateral deviation from the runway centerline in a situation in which the right engine of the aircraft fails when the aircraft has a velocity just below V1. As is shown in FIG. 9B, the aircraft moves laterally when the engine fails, but only by a distance of about five feet, before the system returns the aircraft to the centerline while the aircraft successfully slows down and stops before the end of the runway.

FIG. 9C illustrates predicted aircraft performance in a situation in which the right engine fails at a threshold airspeed (e.g., V1), and the aircraft continues to take off. As is shown in FIG. 9C, the aircraft begins to deviate from the runway centerline when the engine fails, but successfully takes off and maintains the same track it was on when it reached the threshold airspeed. Accordingly, the system will not continue to try and correct lateral deviation once the aircraft achieves the threshold airspeed (e.g., V1). Instead, the aircraft will continue along the track it was on just prior to reaching the threshold airspeed for a time after having achieved the threshold airspeed, including after the aircraft has left the ground.

One feature of embodiments of the systems described above is that they can be configured to automatically guide the aircraft along a runway centerline (or other relevant path) during a takeoff roll. Accordingly, this automatic system can make takeoffs during difficult environmental conditions easier for the flight crew. Such environmental conditions can include icy or wet runways, strong crosswinds, low visibility, and/or engine out scenarios.

Another feature of at least some of the foregoing embodiments is that the system can gradually reduce the degree to which it controls the aircraft lateral position and track angle. For example, in at least some embodiments, the system can cease controlling the aircraft to the runway centerline after the aircraft passes a threshold airspeed (e.g., V1). The system can guide the aircraft to maintain whatever track angle it had just prior to reaching the threshold pitch angle. Furthermore, embodiments of the system can gradually reduce the yaw control provided by the system after the threshold pitch angle is achieved. In particular aspects of these embodiments, the system can disengage as the aircraft lifts off (e.g., 3-4 seconds after achieving the threshold pitch angle). After the system disengages, the flight crew has control over the lateral and directional position of the aircraft and can retain control of the aircraft until engaging the autopilot (typically at an altitude above 200 feet). An advantage of the foregoing arrangement is that it can reduce the tendency for the aircraft to undergo sudden changes in yaw as it lifts off the airport runway.

Still another feature of systems in accordance with embodiments of the invention is that they can automatically respond to an engine out condition. For example, in particular embodiments, the system can automatically trim the rudder to account not only for the last commanded yaw input, but also to account for the yaw input resulting from the yaw moment created by the loss of an engine. This differs from existing systems, which compute a thrust differential based on the loss of an engine and provide a rudder input corresponding to the thrust differential, including a gain factor. A potential advantage of the arrangement described above with reference to FIG. 8 is that it can more directly respond to the yawing moments created by the engine out condition, rather than predicting these effects based on a thrust differential. Accordingly, the system may more accurately, quickly and precisely reduce the yawing moment created by the loss of an engine.

From the foregoing, it will be appreciated that specific embodiments of the invention have been described herein for purposes of illustration, but that various modifications may be made without deviating from the invention. For example, the control laws and sensor techniques described above are representative of particular embodiments of the invention, and may be different in other embodiments. In further embodiments, the aircraft can be controlled to follow a track that is different than a runway centerline. Aspects of the invention described in particular embodiments may be combined or eliminated in other embodiments. For example, some systems may include all the features described above with reference to FIGS. 3-8, and others may include subsets of these features. Although advantages associated with certain embodiments of the invention have been described in the context of those embodiments, other embodiments may also exhibit such advantages. Additionally, not all of the foregoing embodiments need necessarily exhibit such advantages to fall within the scope of the invention. Accordingly, the invention is not limited except as by the appended claims.

We claim:

1. A method for controlling an aircraft, comprising:
    receiving an indication of a target takeoff roll path for an aircraft;
    automatically controlling a direction of the aircraft while the aircraft is on a takeoff roll to at least approximately follow the target takeoff roll path; and
    automatically controlling the direction of the aircraft as the aircraft leaves the ground, wherein automatically controlling the direction of the aircraft includes:
    determining a lateral deviation distance from the target path;
    determining a lateral acceleration;
    filtering the lateral deviation with the lateral acceleration to produce a filtered lateral deviation;
    filtering the lateral acceleration with the lateral deviation to produce a filtered lateral deviation rate;
    determining a commanded lateral position and commanded lateral position rate based on the complementary filtered lateral deviation and complementary filtered lateral deviation rate;
    based on the commanded lateral position, the filtered lateral deviation, the commanded lateral position rate and the filtered lateral deviation rate, determining a first commanded angular position;
    based on the first commanded angular position, a sensed yaw rate, and a commanded lateral acceleration, determining a second commanded angular position; and
    directing a rudder and landing gear of the aircraft to move in a manner that directs the aircraft to the second commanded angular position.

2. The method of claim 1 wherein automatically controlling a direction of the aircraft includes automatically providing an input to a rudder of the aircraft, and wherein the method further comprises:
    receiving an indication of an engine failure; and
    in response to receiving the indication of engine failure, transferring the input from the rudder to a rudder trim element.

3. The method of claim 1, further comprising:
    commanding a ground track angle when an airspeed of the aircraft reaches a threshold value; and
    maintaining the ground track angle as the aircraft airspeed exceeds the threshold value.

4. The method of claim 1, further comprising filtering information corresponding to the target takeoff roll path for the aircraft to reduce noise.

5. A system for controlling an aircraft, comprising:
    a receiver configured to receive an indication of a target takeoff roll path for an aircraft; and
    a controller coupled to the receiver to receive the indication of the target roll path, the controller further being coupled to a steering system of the aircraft to automatically control a direction of the aircraft while the aircraft is on a takeoff roll to at least approximately follow the target takeoff roll path, automatically control the direction of the aircraft as the aircraft leaves the ground, and gradually reduce the automatic control of the aircraft once the aircraft exceeds a threshold condition.

6. The system of claim 5 wherein the controller includes a computer-readable medium having instructions to control the direction of the aircraft.

7. The system of claim 5 wherein the controller automatically provides an input to a rudder of the aircraft, and wherein:
the receiver is configured to receive an indication of an engine failure; and
the controller is configured to maintain the input to the rudder or transfer the input to a rudder trim element in response to the indication of engine failure.

8. The system of claim 5 wherein the controller is configured to gradually reduce the automatic control of the aircraft once the aircraft exceeds a threshold pitch angle.

9. The system of claim 5 wherein the receiver is configured to receive an indication from at least one of a ground-based signal emitter and a satellite-based signal emitter.

10. The system of claim 5 wherein the controller is configured to:
command a ground track angle when an airspeed of the aircraft reaches a threshold value; and
maintain the ground track angle as the airspeed of the aircraft exceeds the threshold value.

11. The system of claim 5 wherein the receiver is configured to receive an indication of a speed of the aircraft and wherein the controller is configured to automatically control a direction of the aircraft only when the speed of the aircraft exceeds a threshold value.

12. The system of claim 5 wherein the controller is configured to:
filter a lateral deviation value with a lateral acceleration value to produce a filtered lateral deviation;
filter the lateral acceleration value with the lateral deviation value to produce a filtered lateral deviation rate;
based on a commanded lateral position, the filtered lateral deviation, a commanded lateral position rate and the filtered lateral deviation rate, determine a first commanded angular position;
based on the first commanded angular position, a sensed yaw rate, and a commanded lateral acceleration, determine a second commanded angular position; and
direct a rudder and landing gear of the aircraft to move in a manner that directs the aircraft to the second commanded angular position.

13. The system of claim 5 wherein the controller is configured to:
automatically control a lateral position of the aircraft when the aircraft travels below a threshold airspeed;
automatically control a track angle of the aircraft when the aircraft travels above the threshold airspeed at less than a threshold pitch angle; and
gradually reduce automatic control of the track angle when the aircraft travels above the threshold pitch angle.

14. A system for controlling an aircraft, comprising:
receiver means for receiving an indication of a target takeoff roll path for an aircraft, wherein the receiver means is configured to receive an indication of an engine failure; and
control means for controlling a direction of the aircraft, the control means being coupled to the receiver means to receive the indication of the target roll path, the control means further being coupled to a steering system of the aircraft to automatically control the direction of the aircraft while the aircraft is on a takeoff roll to at least approximately follow the target takeoff roll path, and automatically control the direction of the aircraft as the aircraft leaves the ground, wherein the control means automatically provides an input to a rudder of the aircraft and is configured to maintain the input to the rudder, wherein maintaining the input to the rudder includes transfering the input to a rudder trim element in response to the indication of engine failure.

15. The system of claim 14 wherein the control means is configured to:
command a ground track angle when an airspeed of the aircraft reaches a threshold value; and
maintain the ground track angle as the airspeed of the aircraft exceeds the threshold value.

16. The system of claim 14 wherein the control means is configured to:
filter a lateral deviation value with a lateral acceleration value to produce a filtered lateral deviation;
filter the lateral acceleration value with the lateral deviation value to produce a filtered lateral deviation rate;
based on a commanded lateral position, the filtered lateral deviation, a commanded lateral position rate and the filtered lateral deviation rate, determine a first commanded angular position;
based on the first commanded angular position, a sensed yaw rate, and a commanded lateral acceleration, determine a second commanded angular position; and
direct a rudder and landing gear of the aircraft to move in a manner that directs the aircraft to the second commanded angular position.

17. A method for controlling an aircraft, comprising:
receiving an indication of a target takeoff roll path for an aircraft;
automatically controlling a direction of the aircraft while the aircraft is on a takeoff roll to at least approximately follow the target takeoff roll path, wherein automatically controlling a direction of the aircraft includes automatically providing an input to a rudder of the aircraft;
receiving an indication of an engine failure; and
in response to receiving the indication of engine failure, transferring the input from the rudder to a rudder trim element.

18. The method of claim 17, further comprising gradually reducing the automatic control of the aircraft once the aircraft exceeds a threshold condition.

19. The method of claim 17, further comprising:
automatically controlling a lateral position of the aircraft when the aircraft travels below a threshold airspeed;
automatically controlling a track angle of the aircraft when the aircraft travels above the threshold airspeed at less than a threshold pitch angle; and
gradually reducing automatic control of the track angle when the aircraft travels above the threshold pitch angle.

20. The method of claim 17 wherein receiving an indication of a target takeoff roll path for an aircraft includes receiving an indication from at least one of a ground-based signal emitter and a satellite-based signal emitter.

21. The method of claim 17, further comprising automatically controlling a lateral direction of the aircraft when an airspeed of the aircraft exceeds a threshold value.

22. The method of claim 17, further comprising receiving an indication of a speed of the aircraft and automatically controlling a direction of the aircraft only when the speed of the aircraft exceeds a threshold value.

23. A method for controlling an aircraft, comprising:
receiving an indication of a target takeoff roll path for an aircraft;
automatically controlling a direction of the aircraft while the aircraft is on a takeoff roll to at least approximately follow the target takeoff roll path; and
gradually reducing the automatic control of the aircraft once the aircraft exceeds a threshold condition.

24. The method of claim 23, further comprising automatically directing a rudder control input device to move in a manner consistent with the direction of the aircraft.

25. The method of claim 23 wherein controlling a direction of the aircraft includes directing motion of an aircraft nosewheel and rudder, and wherein the method further comprises automatically directing a rudder control input device to move in a manner consistent with the movement of the aircraft nosewheel and rudder.

26. The method of claim 23, further comprising receiving an input signal from an operator authorizing automatic control of the aircraft direction.

27. A method for controlling an aircraft, comprising:
receiving an indication of a target takeoff roll path for an aircraft; and
automatically controlling a direction of the aircraft while the aircraft is on a takeoff roll to at least approximately follow the target takeoff roll path including:
automatically controlling a lateral position of the aircraft when the aircraft travels below a threshold airspeed;
automatically controlling a track angle of the aircraft when the aircraft travels above the threshold airspeed at less than a threshold pitch angle; and
gradually reducing automatic control of the track angle when the aircraft travels above the threshold pitch angle.

* * * * *

UNITED STATES PATENT AND TRADEMARK OFFICE
CERTIFICATE OF CORRECTION

| | | |
|---|---|---|
| PATENT NO. | : 7,364,121 B2 | |
| APPLICATION NO. | : 11/080111 | |
| DATED | : April 29, 2008 | |
| INVENTOR(S) | : Firuz et al. | |

It is certified that error appears in the above-identified patent and that said Letters Patent is hereby corrected as shown below:

In column 10, line 9, in Claim 14, delete "transfering" and insert -- transferring --, therefor.

Signed and Sealed this

Sixth Day of January, 2009

JON W. DUDAS
*Director of the United States Patent and Trademark Office*